July 29, 1941.  A. W. MILLER  2,250,495
COUPLING
Filed March 25, 1940
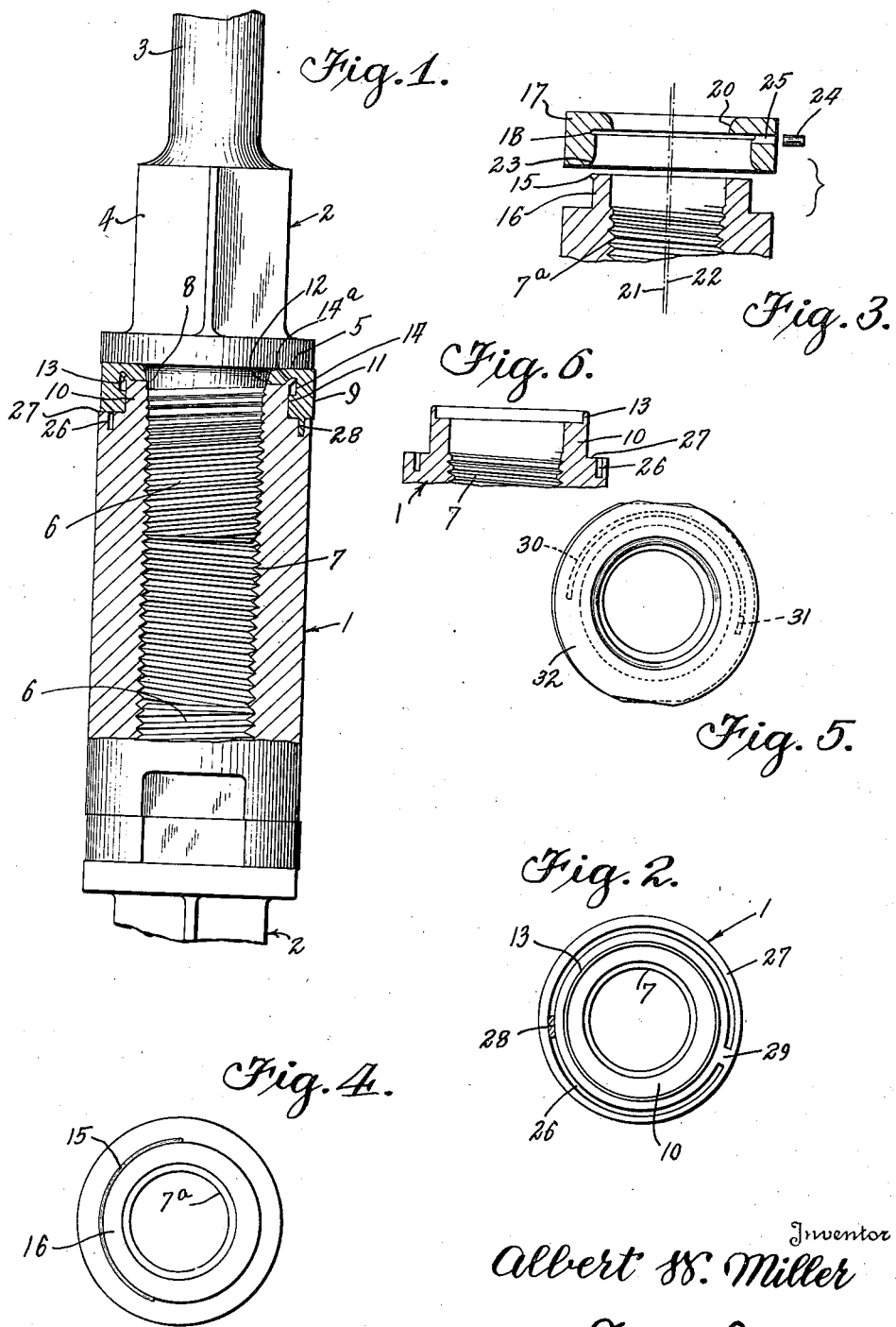
Inventor
Albert W. Miller
By Lyon & Lyon
Attorneys Patented July 29, 1941

2,250,495

UNITED STATES PATENT OFFICE 2,250,495

COUPLING

Albert W. Miller, Jamaica, N. Y.

Application March 25, 1940, Serial No. 325,682

6 Claims. (Cl. 287—125)

This invention relates to a coupling such as employed in various situations for connecting two parts together end to end. While the invention is capable of being applied for many specific purposes, in the present specification it is described as applied to a coupling for connecting any members, for example, sections of a pump rod.

The invention is most useful when applied to a pump rod of deep wells, such as oil wells. In operating sucker rods or pump rods in very deep wells, the strains on the thread connections between the rod ends at the couplings, are very great, and the vibration and constant reversing of these strains on the up-and-down stroke, tend to loosen up the thread connections. Of course, if this occurs, and any lost motion develops at the coupling, the vibration will increase and may cause crystallization, so that the connection will break.

One of the objects of the present invention is to provide a coupling of simple construction, so constructed that after the thread connection has been effected at the coupling, the parts will be locked together so that they will not become loose from vibration nor from the reversing forces occasioned in the reciprocation of the pump rod; also to provide such a construction that can be unscrewed if sufficient torque is applied but which will not work loose in ordinary usage.

A further object of the invention is to provide a coupling of this kind so constructed that the practice of the invention does not necessitate any change in the construction of the end of the pump rod and only involves a very slight modification of structure of the ends of the coupling that connect the adjacent rod sections.

In the practice of the invention, I employ a collar preferably carried on the end of the coupling member, and I provide means for utilizing eccentric action to develop opposed lateral forces that will give great resistance to unscrewing of the coupling. For this purpose the collar is provided with an opening that seats at the root of the threaded pin that is usually formed on the end of the rod, and which is screwed into the box or threaded socket in the end of the coupling member. When the parts are in their neutral position, the axis of the opening in the collar will be in alignment with the axis of the threaded pin. The eccentricity is slight, but sufficient to enable the collar and coupling member to tighten up very securely on the threaded pin upon a relative rotation of the collar and the coupling member. One of the objects of the invention is to construct these parts in such a way that the collar can be rotated relatively to the coupling member through more than one hundred and eighty degrees in bringing the "eccentric lock" into action, further rotation being stopped at this point so that although a very tight grip is maintained on the threaded pin, the coupling will not work itself loose under the action of vibration or reversing forces acting through the rod and coupling.

A further object of the invention is to provide simple means for holding the collar on the end of the coupling member yieldingly in its neutral position, at which time the opening in the collar is in alignment with the axis of the threaded box or socket, thereby facilitating the introduction of the threaded pin through the collar and into the threaded box.

A further object of the invention is to provide a construction for a coupling of this kind, slightly modified from that described above, and in which the collar in unscrewing the coupling, can be rotated past the neutral position and into a position in which the joint parts will become tight again but without applying the "lock" that is applied by the rotation of the collar in the forward direction. This enables a pump rod string to be made up in which certain spaced couplings in the string will unscrew, without unscrewing the rod string at the intermediate couplings. This feature is desirable in many situations, as it enables a rod string being pulled, to be unscrewed in stands composed of several connected rod sections.

A further object of the invention is to provide a coupling of this kind that can be applied to an ordinary threaded pin-and-box type of coupling without dangerously reducing the cross-section of the parts involved in the coupling.

Further objects of the invention will appear hereinafter.

The invention consists in the novel parts and combination of parts to be described hereinafter, all of which contribute to produce an efficient coupling.

A preferred embodiment of the invention is described in the following specification, while the broad scope of the invention is pointed out in the appended claims.

In the drawing:

Fig. 1 is a partial side elevation and vertical section showing the adjacent ends of two pump-rod sections connected by a coupling embodying my invention. The collar at the upper end of the coupling member in this view is shown interconnected with the coupling body, and in its locked position.

Fig. 2 is a plan view showing the upper end of the body of the coupling shown in Fig. 1, but with the collar removed, and illustrating means that I may employ for limiting the relative rotation of the collar and the coupling member.

Fig. 3 is a fragmentary sectional view illustrating a modified construction that I may employ for interconnecting the collar and the coupling member, and showing the collar about to be pressed into telescoping relation with the end of the coupling member to effect this yielding interconnection in a position such that the axis of the opening through the collar will be in alignment with the axis of the threaded box or pin socket.

Fig. 4 is a plan of the upper end of the coupling body shown in Fig. 3, but showing it removed from the end of the rod.

Fig. 5 is a plan of the coupling with the collar in place, illustrating a modified construction for the stop means, which will enable the coupling to be used as a locking coupling by relative rotation of the collar past the one hundred and eighty degree position.

Fig. 6 is a section through the upper end of the coupling member of Fig. 1, before it is interlocked with the collar.

In practicing the invention as applied to a pump rod, I provide a coupling member 1, which connects the adjacent heads 2 of two pump rods such as the rod indicated at 3. These heads usually include a square neck 4 to which a wrench may be applied, and beyond this point the diameter is enlarged to form an outwardly projecting annular shoulder 5 beyond the side of the usual threaded pin 6 that is received in the threaded "box" or socket 7. The pin 6 is usually slightly tapered at its root 8, that is to say, a fillet or substantially conical face is formed at this point where the thread stops. Seated on the end of the coupling member 1 and adjacent the shoulder 5, I provide a collar 9, and between the collar and the coupling member I provide an eccentric connection. In order to accomplish this, I prefer to form the end of the coupling member with an eccentric round boss 10, and the collar 9 has an eccentric bore 11 to fit over this boss. In addition to this the collar, of course, has an opening 12 through it, the axis of which is eccentric to the collar. In the normal or neutral position of the collar 9 on the boss 10, the axis of the opening 12 will be in alignment with the axis of the threaded socket 7 for the threaded pin 6. In this position the pin will be screwed into the end of the coupling member 1. After this occurs the threaded connection is "locked" by effecting a relative rotation of the collar 9 and the coupling member 1. In doing this, of course, the greatest binding or tightening effect on the conical face 8 and on the side of the pin at the threads, will occur when the eccentric collar 9 has been rotated through one hundred and eighty degrees. In accordance with my invention I provide means for stopping this relative rotation slightly after the one hundred and eighty degree position of the eccentric has been passed. When this is done, it will be evident that if any force tended to move the collar 9 in a backward rotation, and consequently to disengage the connection, this force would have to be considerable, because the eccentric will become even tighter as it is passing back toward the one hundred and eighty degree position. I provide means which will be described hereinafter for stopping the relative rotation of these parts just beyond the one hundred and eighty degree position.

It is preferable in practicing the invention to provide means for yieldingly holding the collar 9 in its neutral position on the boss 10 when it is applied to the boss. This will hold the collar 9 with its opening 12 in the proper position to facilitate connecting up the coupling. In order to accomplish this, I prefer to provide the end of the boss at its outer face with a small bead or fin 13, and I form a corresponding circumferential groove in the bore 11 of the collar 9 to take this bead. The size of this fin is exaggerated in Fig. 1, but in practice it is fery small and constructed as illustrated in Fig. 6 so that it will be bent into the groove 14 as the collar is pressed down over the boss in its neutral position. Due to the inclined face 14a at the bottom of the groove 14 and the length of the fin, the end of the fin will be forced out against the circumferential wall of the groove and will hold the collar yieldingly in this position. The groove 14 has considerable vertical depth. This enables the collar to pull away slightly from the coupling member and follow the rod head when the rod is being unscrewed from the coupling.

I may provide means to cooperate with the fin or bead to limit the rotation of the collar on the body of the coupling. Instead of the fin 13, I may employ a small rounded bead 15 (see Figs. 3 and 4), that extends circumferentially for a little less than one hundred and eighty degrees on the periphery of the boss 16. And in the collar 17 an internal groove 18 is cut, into which the bead will fit. The radius to the outside of this bead is very slightly greater than that of the boss, so that if the collar 19 is pressed down over it the bead will snap into the groove so as to hold the collar yieldingly rotatable on the boss. Of course, when the collar 19 is in its neutral position, the axis 21 of the opening 20 in the collar will coincide with the axis of the threaded box or socket 7a, but after rotation of the collar the axis of the opening will move to the right and toward the position of the dotted line 22. The mouth of the bore of the collar may be slightly rounded as at 23 to facilitate pressing the collar onto the boss. In order to stop the collar after rotation through one hundred and eighty degrees plus, a pin 24 is driven tight into a radial hole 25 drilled into the side of the collar in the plane of the bead, (see Fig. 3). When the end of the bead strikes this pin the collar will have been rotated through slightly more than one hundred and eighty degrees.

In Figs. 1 and 2, I illustrate stop means for the collar 9 as including a circumferential groove 26 which is made in the lower face of the collar that seats against the annular shoulder 27 that is formed around the boss 10, and on this shoulder or face 27 of the coupling member I form a stop preferably in the form of an integral tongue 28 (see Figs. 1 and 2), which travels in the groove 26 and strikes the abutment 29 at the end of the groove a little beyond the one hundred and eighty degree position. In Fig. 2, 28 indicates the position of the tongue in the neutral position of the collar.

In Fig. 5 I illustrate a construction in which a groove 30 is formed in the coupling member that extends only through slightly more than one hundred and eighty degrees. In this view, 31 indicates the tongue of the collar 32 in its locking position on the eccentric boss. In this position the collar 32 will have been rotated slightly past its tightest position on the eccentric boss, and this develops transverse opposed clamping forces in the coupling body 1 and the collar, and attains a locking effect because the collar would have to become tighter in rotating back toward its neutral position.

The same locking effect is attained in the Fig. 2 construction if the collar is rotated in a right-hand direction to bring the tongue 28 against the abutment.

In practice, the eccentricity of the boss 10 should be very slight—only a few thousandths of an inch, but in the drawing it has been necessary to exaggerate the eccentricity in order to make it apparent at all.

If a pump rod is made up of rod sections with couplings as described above, the couplings will not work loose because they would have to become tighter first, which, of course, they would not do. But of course, the couplings can be unscrewed if sufficient torque is applied by hand or by power.

In some cases in practice, means may be available to apply wrench power or torque at an elevation above the derrick floor. Under these circumstances, in making up a pump rod it is merely necessary to hold the rod below the coupling 1 against rotation and rotate the rod 3 above the coupling. As the shoulder 5 strikes the collar it will force the collar around with it past the one hundred and eighty degree point to stop the tongue on the collar at the end of groove 30 in the Figure 5 construction, or at the abutment 29 in the Figure 2 construction.

In order to enable the pump rod to be broken out in stands, I would recommend using a less degree of eccentricity in every third or fourth coupling in the rod, while using slightly greater eccentricity in the intermediate couplings. This will enable the third or fourth couplings to unscrew easier than the others. Or, if desired, I may use the Figure 5 type of coupling on every third or fourth joint and the Figure 2 type at the intermediate joints. If the collar in the Figure 2 type is rotated back past the neutral position, it can be brought around to the other side of the abutment which will develop a lock in this backward direction, preventing the joint from further rotation. The third or fourth joints, however, will stop in their neutral position when their collars are rotated back, and will unscrew at this position.

If desired, the eccentric action may be accomplished by having a collar only eccentric, or the boss only may be made eccentric. Any eccentric connection between these parts that will enable the opening in the collar to jam against the side of the pin when the collar is rotated, may be used in practicing the invention. Furthermore, it is obvious that if desired, the opening in the collar could be threaded, and the parts could still cooperate in substantially the same way as described above. But as threading the collar would merely increase the expense, it is unnecessary to do this.

Many other embodiments of the invention may be resorted to without departing from the spirit of the invention.

What I claim is:

1. In a coupling construction, the combination of a member having a head with a shoulder, a coupling member having a thread connection to the head including a threaded pin, a collar rotatable on the pin between the shoulder and the end of said coupling member, an eccentric connection between one of said parts and said collar, said collar having an opening therethrough mounting the collar for rotation on the pin, said collar capable of assuming a neutral position on the eccentric connection in which the opening in the collar aligns with the axis of the thread connection, to receive the pin; and means for stopping a relative rotation of the collar with respect to the other parts when the same has been rotated in one direction through more than one hundred and eighty degrees from the said neutral position, whereby the resistance to relative rotation of the eccentric parts immediately increases upon a reverse relative rotation of the eccentric connection.

2. In a coupling construction, the combination of a member having a head with a shoulder and having a threaded pin beyond the shoulder, a coupling member having a threaded socket to receive the threaded pin, a collar having an opening mounting the same for rotation at the root of the pin and between the shoulder and the end of said coupling member, said coupling member having a boss on its end, said collar having an eccentric bore receiving the said boss, and capable of assuming a neutral position on the eccentric boss in which the opening in the collar is in alignment with the axis of the threaded pin, when the coupling is to be connected; and stop means for stopping relative rotation of the collar with respect to the coupling member when the same has been rotated through more than one hundred and eighty degrees from said neutral position, whereby the resistance to relative rotation of the collar immediately increases upon a relative rotation of the collar in a reverse direction.

3. In a coupling construction, the combination of a member having a head with a shoulder, and having a threaded pin beyond the shoulder, a coupling member having a threaded socket to receive the threaded pin and having an eccentric boss on its end adjacent the shoulder, a collar having an eccentric socket fitting on said boss and rotatable thereon, said collar having an opening therein and seating against the said shoulder adjacent the root of said threaded pin, said collar and said coupling member being constructed so as to enable them to have a relative rotation of more than one hundred and eighty degrees; and stop means between the collar and the coupling member to arrest the said relative rotation after the same has passed one hundred and eighty degrees.

4. In a coupling construction, the combination of a rod having a head with a shoulder, and having a threaded pin beyond the shoulder, a coupling member having a threaded socket to receive the threaded pin and having an eccentric boss on its end adjacent the shoulder, a collar having an eccentric bore fitting on said boss and rotatable thereon, said collar having an opening therein to lie adjacent the shoulder at the root of said pin, the adjacent faces of said collar and said coupling member having the one a circumferentially disposed groove extending through more than one hundred and eighty degrees, and the other a bead running in the groove, said groove and bead cooperating to stop relative rotation of the collar and the coupling member after the rotation has passed one hundred and eighty degrees.

5. In a coupling construction, the combination of a rod having a head with a shoulder, and having a threaded pin beyond the shoulder, a coupling member having a threaded socket to receive the threaded pin and having an eccentric boss on its end adjacent the shoulder, a collar having an eccentric bore fitting on said boss and rotatable thereon, said collar having an eccentric opening therein to lie adjacent the shoulder at the root of said pin, the face of the coupling member having a projecting circumferential bead on its face adjacent the collar, and said collar having a circumferential groove to receive the same, said groove and bead cooperating to yieldingly hold the collar on the coupling member for rotation on the boss.

6. In a coupling construction, the combination of a rod having a head with a shoulder and having a threaded pin beyond the shoulder, a coupling member having a threaded socket to receive the threaded pin, a collar having an opening mounting the same for rotation at the root of the pin and between the shoulder and the end of said coupling member, said coupling member having a boss on its end, said collar having an eccentric bore receiving the said boss, and capable of assuming a neutral position on the eccentric boss in which the opening in the collar is in alignment with the axis of the threaded pin, when the coupling is to be connected; said collar having a projecting tongue, and said coupling member having a groove receiving the same, and cooperating with the collar in its neutral position to align the axis of the collar opening with the axis of the threaded socket, said groove having an abutment permitting rotation of the collar through more than one hundred and eighty degrees in a forward direction with respect to the thread, and through less than one hundred and eighty degrees in a reverse direction, the rotation in either direction operating to tighten the collar and the coupling member on the pin.

ALBERT W. MILLER.